US011921307B2

(12) United States Patent
Wang et al.

(10) Patent No.: US 11,921,307 B2
(45) Date of Patent: Mar. 5, 2024

(54) OPTICAL ELEMENT DRIVING MECHANISM

(71) Applicant: TDK TAIWAN CORP., Taoyuan (TW)

(72) Inventors: Chao-Hsi Wang, Taoyuan (TW);
Chao-Chang Hu, Taoyuan (TW);
Chih-Wei Weng, Taoyuan (TW);
Kuen-Wang Tsai, Taoyuan (TW);
Tzu-Ying Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 133 days.

(21) Appl. No.: 17/570,819

(22) Filed: Jan. 7, 2022

(65) Prior Publication Data

US 2022/0221640 A1 Jul. 14, 2022

Related U.S. Application Data

(60) Provisional application No. 63/135,402, filed on Jan. 8, 2021.

(51) Int. Cl.
| | |
|---|---|
| *G02B 5/30* | (2006.01) |
| *G02B 5/00* | (2006.01) |
| *G02B 7/00* | (2021.01) |
| *G02B 13/00* | (2006.01) |
| *G02B 26/02* | (2006.01) |
| *G03B 5/00* | (2021.01) |
| *G03B 30/00* | (2021.01) |

(52) U.S. Cl.
CPC ............... *G02B 5/30* (2013.01); *G02B 5/005* (2013.01); *G02B 7/005* (2013.01); *G02B 7/006* (2013.01); *G02B 13/0075* (2013.01); *G02B 26/023* (2013.01); *G03B 5/00* (2013.01); *G03B 30/00* (2021.01); *G02B 5/3025* (2013.01); *G03B 2205/0069* (2013.01)

(58) Field of Classification Search
CPC ........ G02B 5/30; G02B 5/005; G02B 5/3025; G02B 7/00; G02B 7/006; G02B 7/005; G02B 13/0075; G02B 26/023; G02B 27/646; G03B 5/00; G03B 2205/0069; G03B 30/00
USPC ..................................... 359/490.02
See application file for complete search history.

(56) References Cited

U.S. PATENT DOCUMENTS 4,697,890 A * 10/1987 Crookston ............... F21V 9/40
359/489.14
5,260,827 A * 11/1993 Dziekan ................ G02B 7/006
359/488.01

(Continued)

FOREIGN PATENT DOCUMENTS

CN 110213415 A * 9/2019

*Primary Examiner* — Derek S. Chapel
(74) *Attorney, Agent, or Firm* — MUNCY, GEISSLER, OLDS & LOWE, P.C.

(57) ABSTRACT

The present disclosure provides an optical element driving mechanism, which includes a movable part, a fixed assembly, and a driving assembly. The movable part is configured to be connected to an optical element. The movable part is movable relative to the fixed assembly. The driving assembly is configured to drive the movable part to move relative to the fixed assembly. The movable part includes a connecting assembly configured to position the optical element.

19 Claims, 10 Drawing Sheets

(56) References Cited

U.S. PATENT DOCUMENTS

| | | | | |
|---|---|---|---|---|
| 5,999,317 | A * | 12/1999 | Whitney | G02B 27/28 |
| | | | | 359/490.02 |
| 8,070,304 | B2 * | 12/2011 | Matsuoka | G02B 13/003 |
| | | | | 359/601 |
| 8,164,827 | B2 * | 4/2012 | Robinson | G01J 5/0875 |
| | | | | 359/356 |
| 8,797,648 | B2 * | 8/2014 | Motahedy | G02B 7/006 |
| | | | | 359/488.01 |
| 9,036,260 | B2 * | 5/2015 | Sugawara | H04N 23/687 |
| | | | | 359/557 |
| 10,812,724 | B2 * | 10/2020 | Kuo | H04N 23/687 |
| 2018/0321506 | A1 * | 11/2018 | Minamisawa | H04N 23/55 |
| 2019/0391357 | A1 * | 12/2019 | Kobayashi | G02B 5/30 |
| 2020/0073214 | A1 * | 3/2020 | Yamazaki | G03B 17/565 |
| 2020/0249447 | A1 * | 8/2020 | Chen | G02B 7/021 |
| 2020/0292776 | A1 * | 9/2020 | Chen | G02B 7/023 |
| 2021/0018818 | A1 * | 1/2021 | Cha | G02B 7/09 |
| 2021/0373277 | A1 * | 12/2021 | Qiu | G02B 7/026 |
| 2022/0146780 | A1 * | 5/2022 | Lin | G02B 7/04 |
| 2022/0221625 | A1 * | 7/2022 | Weng | G02B 5/30 |
| 2022/0244484 | A1 * | 8/2022 | Weng | G02B 7/023 |

\* cited by examiner

OPTICAL ELEMENT DRIVING MECHANISM

CROSS REFERENCE TO RELATED APPLICATIONS

This application claims the benefit of U.S. Provisional Application No. 63/135,402, filed on Jan. 8, 2021, the entirety of which is incorporated by reference herein.

BACKGROUND OF THE DISCLOSURE

Field of the Disclosure

The present disclosure relates to an optical element driving mechanism, and in particular it relates to an optical element driving mechanism with a polarizer.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

BRIEF SUMMARY OF THE DISCLOSURE

According to some embodiments of the disclosure, the present disclosure provides an optical element driving mechanism, which includes a movable part, a fixed assembly, and a driving assembly. The movable part is configured to be connected to an optical element. The movable part is movable relative to the fixed assembly. The driving assembly is configured to drive the movable part to move relative to the fixed assembly. The movable part includes a connecting assembly configured to position the optical element.

According to some embodiments, a light beam travels along an optical axis to pass through the optical element and a first opening of the fixed assembly. The driving assembly is configured to drive the movable part to rotate around a rotating axis. The rotating axis is parallel to the optical axis.

According to some embodiments, the optical element has a plate-shaped structure. The optical element has a light-transmissible material. The optical element includes a polarizer. The optical element has an identification structure corresponding to the connection assembly. When viewed along the optical axis, the optical element includes a first side parallel to a first axis, and a second side parallel to a second axis. The first axis is perpendicular to the second axis. When viewed along the optical axis, the identification structure has a recessed structure.

According to some embodiments, the identification structure is located between the first side and the second side. When viewed along the optical axis, the identification structure has a hypotenuse, which is not parallel to the first side and the second side. When viewed along the optical axis, the included angle between the hypotenuse and the first side is different from the included angle between the hypotenuse and the second side. When viewed along the optical axis, the included angle between the hypotenuse and the first side is between 140 degrees and 175 degrees.

According to some embodiments, the connecting assembly includes a first connecting element that corresponds to the optical element, a second connecting element that corresponds to the optical element, and a third connecting element that corresponds to the optical element. The first connecting element has a recessed structure. The second connecting element has a recessed structure. The third connecting element has a recessed structure.

According to some embodiments, when viewed along the optical axis, the optical element further includes a third side, which is parallel to the second axis. The first connecting element is disposed between the first side and the hypotenuse. The second connecting element is disposed between the second side and the hypotenuse. The third connecting element is disposed between the first side and the third side. When viewed along the optical axis, the optical element has a polygonal structure.

According to some embodiments, when viewed along the optical axis, the first connecting element is located between the second connecting element and the third connecting element. When viewed along the optical axis, the shortest distance between the first connecting element and the second connecting element is different from the shortest distance between the first connecting element and the third connecting element.

According to some embodiments, the optical element driving mechanism further includes a first adhesive element, a second adhesive element, and a third adhesive element. The optical element is fixedly connected to the movable part by the first adhesive element. The optical element is fixedly connected to the movable part by the second adhesive element. The optical element is fixedly connected to the movable part by the third adhesive element. The first adhesive element is disposed in the first connecting element. The first adhesive element is in direct contact with the first side. The first adhesive element is in direct contact with the hypotenuse. The second adhesive element is disposed in the second connecting element. The second adhesive element is in direct contact with the second side. The second adhesive element is in direct contact with the hypotenuse.

According to some embodiments, the third adhesive element is disposed in the third connecting element. The third adhesive element is in direct contact with the third side. The third adhesive element is in direct contact with the first side. There is a gap between the first adhesive element and the third adhesive element. The first adhesive element and the second adhesive element are integrally formed.

According to some embodiments, the fixed assembly includes an outer frame and a base. The outer frame has a top wall with a plate-shaped structure. The base forms an accommodating space with the outer frame to accommodate the movable part. The first opening is formed on the base. The fixed assembly further includes a second opening formed on the top wall. The light beam enters the optical element driving mechanism and is configured to sequentially pass through the second opening, the optical element, and the first opening.

According to some embodiments, when viewed along the optical axis, a maximum size of the first opening is different from a maximum size of the second opening. When viewed along the optical axis, the maximum size of the first opening is greater than the maximum size of the second opening. The movable part has a receiving structure configured to receive the optical element. The top wall has a top wall surface facing the movable part. The top wall surface faces the optical element. The shortest distance between the movable part and the top wall surface is less than the shortest distance between the optical element and the top wall surface.

According to some embodiments, the optical element driving mechanism further includes a restricting assembly configured to restrict the movable part to rotate within an extreme motion range relative to the fixed assembly. The extreme motion range is greater than 90 degrees. The restricting assembly includes a protruding portion and a recessed portion. The protruding portion and the movable part are integrally formed as one piece. The recessed portion corresponds to the protruding portion and has a first blocking surface and a second blocking surface. When the movable part is located in a first extreme position relative to the fixed assembly, the protruding portion is in direct contact with the first blocking surface. When the movable part is located in a second extreme position relative to the fixed assembly, the protruding portion is in direct contact with the second blocking surface. An included angle formed by the first blocking surface and the second blocking surface is not 90 degrees.

According to some embodiments, the light beam is incident on an optical module after passing through the optical element driving mechanism. The optical element driving mechanism is configured to be installed in an electronic apparatus. The electronic apparatus includes a protection element, and the light beam is incident on the optical element after passing through the protection element. The protection element has a light-transmissible material.

According to some embodiments, the optical element driving mechanism further includes a control assembly configured to control the driving assembly to drive the movable part to be in a first position or a second position relative to the fixed assembly. The angle between the first position and the second position is 90 degrees.

According to some embodiments, the first position is different from the first extreme position and the second extreme position. The second position is different from the first extreme position and the second extreme position. When the movable part is located in the first position, the protruding portion does not contact the recessed portion. When the movable part is located in the second position, the protruding portion does not contact the recessed portion.

According to some embodiments, the driving assembly includes: a first coil; a second coil; and a magnetic element. The first coil includes: a first section, having a linear structure; and a second section, having a linear structure. When viewed along the optical axis, the included angle between the first section and the second section is greater than 90 degrees. The second coil includes: a third section, having a linear structure; and a fourth section, having a linear structure. When viewed along the optical axis, the included angle between the third section and the fourth section is greater than 90 degrees.

According to some embodiments, the first coil is electrically connected to the second coil. When a current enters the driving assembly and when viewed along the optical axis, a current direction of the first coil is opposite to a current direction of the second coil. The magnetic element includes: a first magnetic pole pair, including a first north pole and a first south pole; and a second magnetic pole pair, including a second north pole and a second south pole. An arrangement direction of the first north pole and the first south pole is parallel to the optical axis. The first north pole faces the first section. The first north pole faces the third section.

According to some embodiments, an arrangement direction of the second north pole and the second south pole is parallel to the optical axis. The second south pole faces the second section. The second south pole faces the fourth section. The arrangement direction of the first north pole and the first south pole is opposite to the arrangement direction of the second north pole and the second south pole.

According to some embodiments, when the movable part is located in any position within the extreme motion range and when viewed along the optical axis, the first section remains partially overlapping the first magnetic pole pair. When the movable part is located in any position within the extreme motion range and when viewed along the optical axis, the third section remains partially overlapping the first magnetic pole pair. When the movable part is located in any position within the extreme motion range and when viewed along the optical axis, the first section and the second magnetic pole pair remain non-overlapping. When the movable part is located in any position within the extreme motion range and when viewed along the optical axis, the third section and the second magnetic pole pair remain non-overlapping.

According to some embodiments, when the movable part is located in any position within the extreme motion range and when viewed along the optical axis, the second section remains partially overlapping the second magnetic pole pair. When the movable part is located in any position within the extreme motion range and when viewed along the optical axis, the fourth section remains partially overlapping the second magnetic pole pair. When the movable part is located in any position within the extreme motion range and when viewed along the optical axis, the second section and the first magnetic pole pair remain non-overlapping. When the movable part is located in any position within the extreme motion range and when viewed along the optical axis, the fourth section and the first magnetic pole pair remain non-overlapping. The first magnetic pole pair and the second magnetic pole pair are integrally formed in one piece.

The present disclosure provides an optical element driving mechanism, including a movable part, a fixed assembly, and a driving assembly. The movable part is movable relative to fixed assembly. The driving assembly is configured to drive the movable part to move relative to the fixed assembly. A receiving structure is formed on the movable part, which is configured to receive the optical element, and the optical element has an identification structure, so that the optical element can be quickly positioned on the movable part.

The movable part also includes a connecting assembly configured to position the optical element. The connecting assembly includes multiple connecting elements, which are communicated with the receiving structure. For example, each of the connecting elements has an arc-shaped groove, and multiple adhesive elements can be respectively disposed in the connecting elements and configured to fix the optical element on the movable part. Based on the design of this disclosure, it can be ensured that when the optical element driving mechanism is impacted, the optical element can be stably fixed on the movable part.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
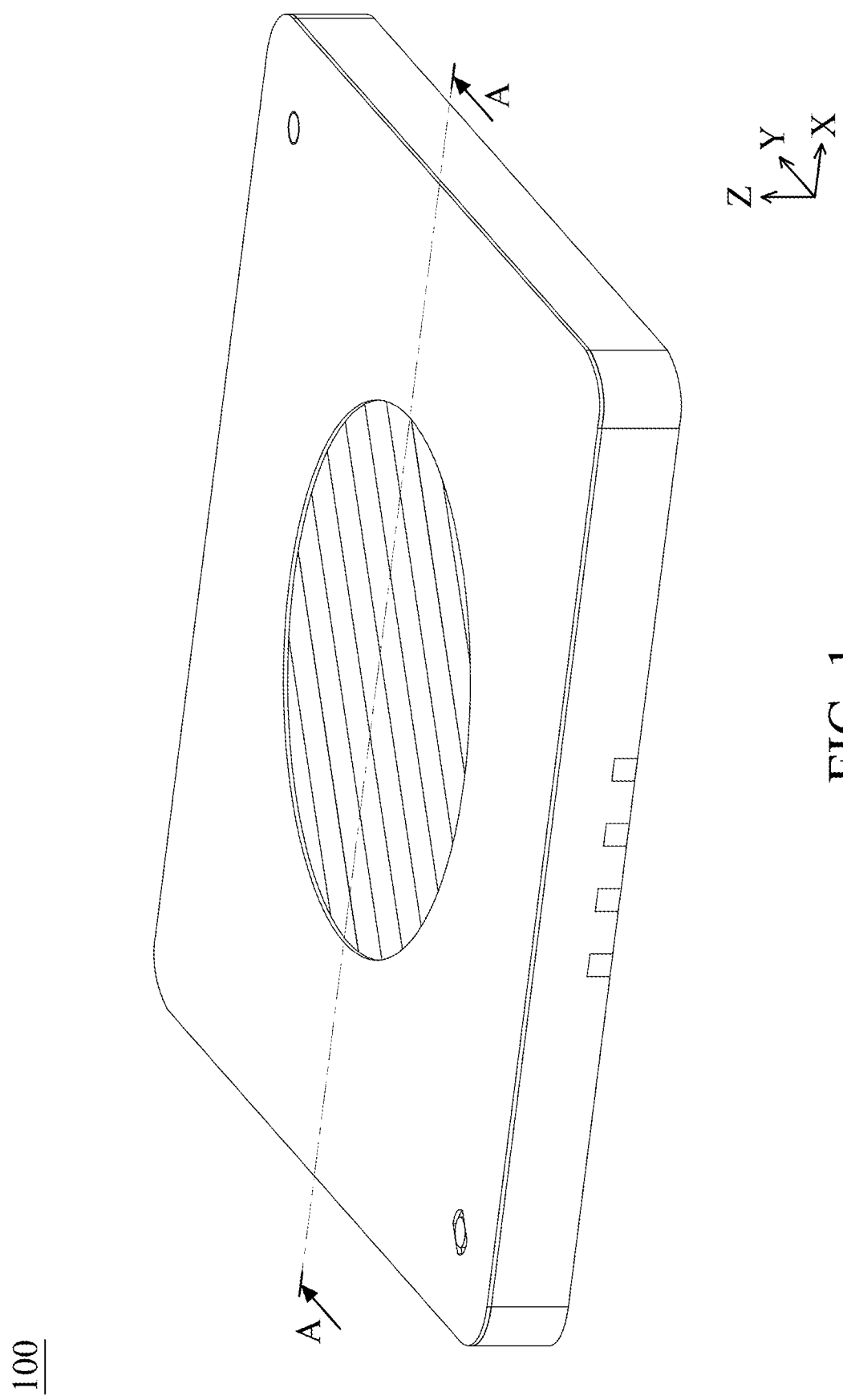
FIG. 1 shows a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
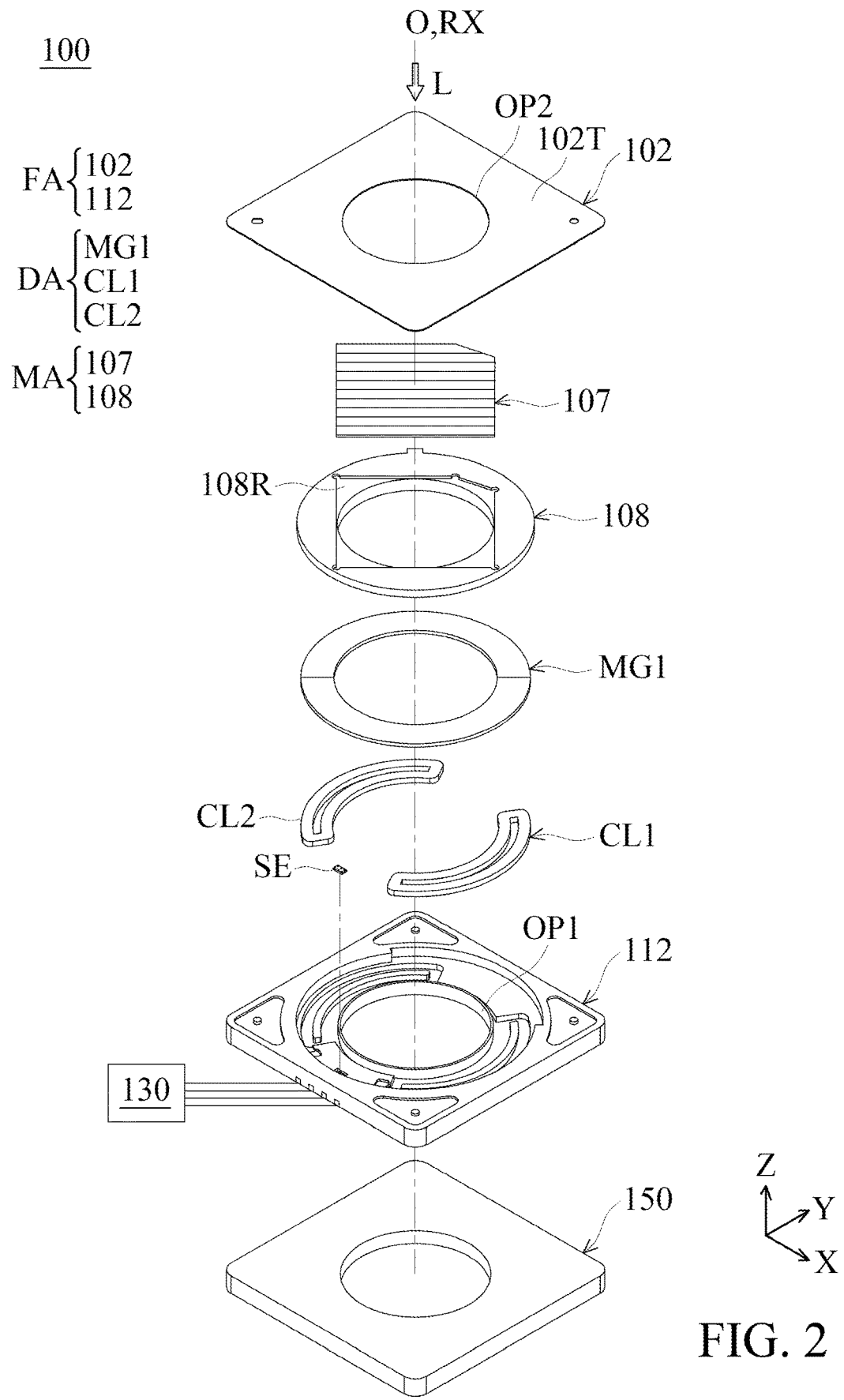
FIG. 2 shows an exploded diagram of the optical element driving mechanism 100 according to the embodiment of the present disclosure.
Figure 3:
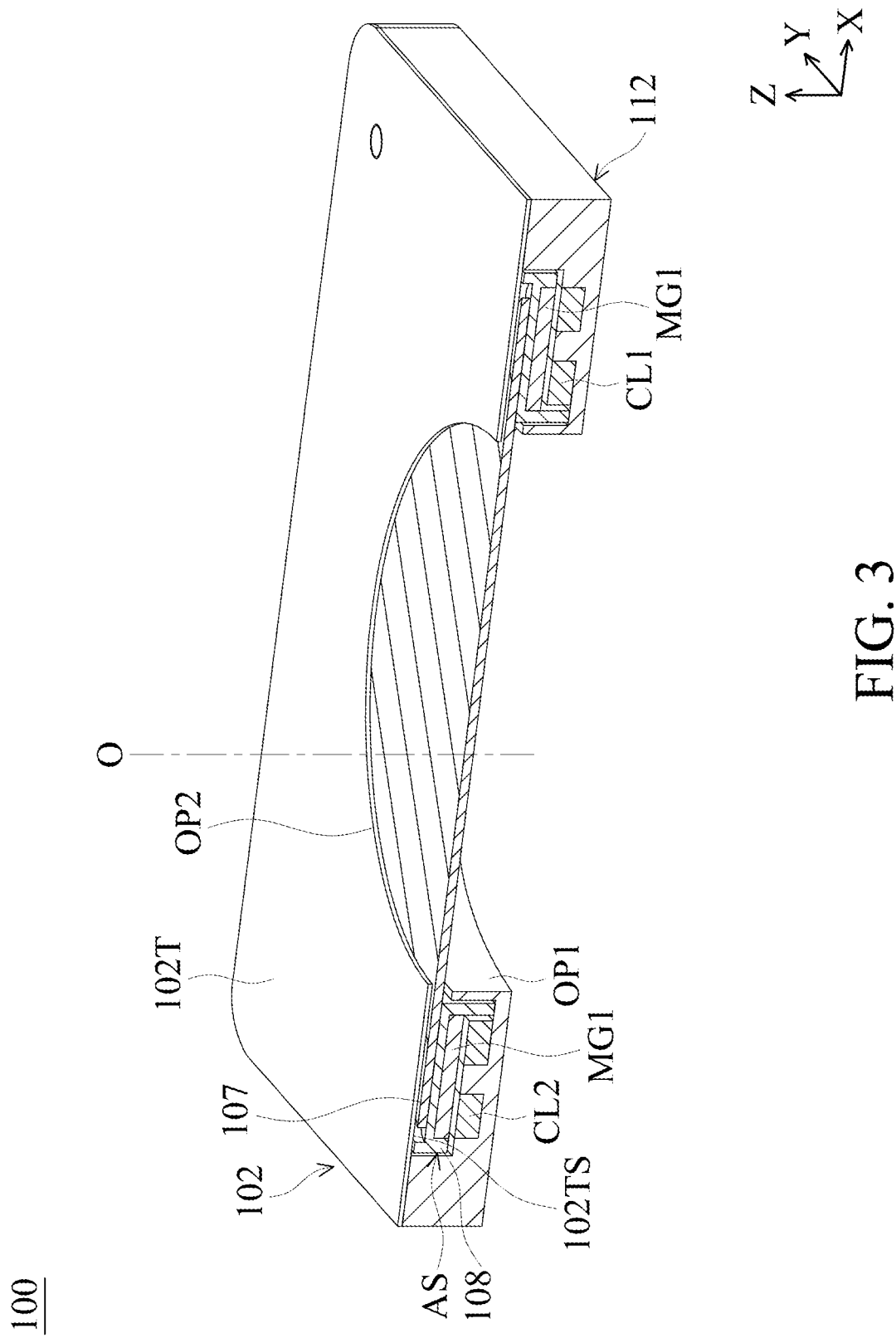
FIG. 3 shows a cross-sectional view of the optical element driving mechanism 100 along line A-A in FIG. 1 according to the embodiment of the present disclosure.

Please refer to FIG. 1 to FIG. 3. FIG. 1 shows a schematic diagram of an optical element driving mechanism 100 according to an embodiment of the present disclosure, FIG. 2 shows an exploded diagram of the optical element driving mechanism 100 according to the embodiment of the present disclosure, and FIG. 3 shows a cross-sectional view of the optical element driving mechanism 100 along line A-A in FIG. 1 according to the embodiment of the present disclosure. The optical element driving mechanism 100 can be an optical module and can be configured to hold and drive an optical element. The optical element driving mechanism 100 can be installed in different electronic devices or portable electronic devices, such as a smartphone, for allowing a user to perform the image adjustment function.

In this embodiment, the optical element driving mechanism 100 may include a fixed assembly FA, a movable assembly MA, and a driving assembly DA. The movable assembly MA is movably connected to the fixed assembly FA. The driving assembly DA is configured to drive the movable assembly MA to move relative to the fixed assembly FA.

In this embodiment, as shown in FIG. 2, the fixed assembly FA includes an outer frame 102 and a base 112. The outer frame 102 includes a top wall 102T having a plate-shaped structure. The base 112 and the outer frame 102 form an accommodating space AS configuration to accommodate the movable part 108 and the driving assembly DA (FIG. 3).

The movable assembly MA may include a movable part 108 and an optical element 107, and the movable part 108 is configured to be connected to the optical element 107. The movable part 108 is movable relative to the fixed assembly FA, and the driving assembly DA is configured to drive the movable part 108 and the optical element 107 to move relative to the fixed assembly FA.

The optical element 107 may have a plate-shaped structure, and the optical element 107 may have a light-transmissible material. For example, the optical element 107 can be a polarizer, but it is not limited thereto. In other embodiments, the optical element 107 may be an optical filter such as a gradient mirror or a star mount mirror.

As shown in FIG. 2, a light beam L can travel along an optical axis O to pass through the optical element 107 and a first opening OP1 of the fixed assembly FA, and then is received by an optical module 150 under the optical element driving mechanism 100 to generates a digital image signal. The first opening OP1 is formed on the base 112.

Furthermore, the fixed assembly FA further includes a second opening OP2 formed on the top wall 102T. The light beam L enters the optical element driving mechanism 100 and is configured to sequentially pass through the second opening OP2, the optical element 107, and the first opening OP1.

Figure 8:
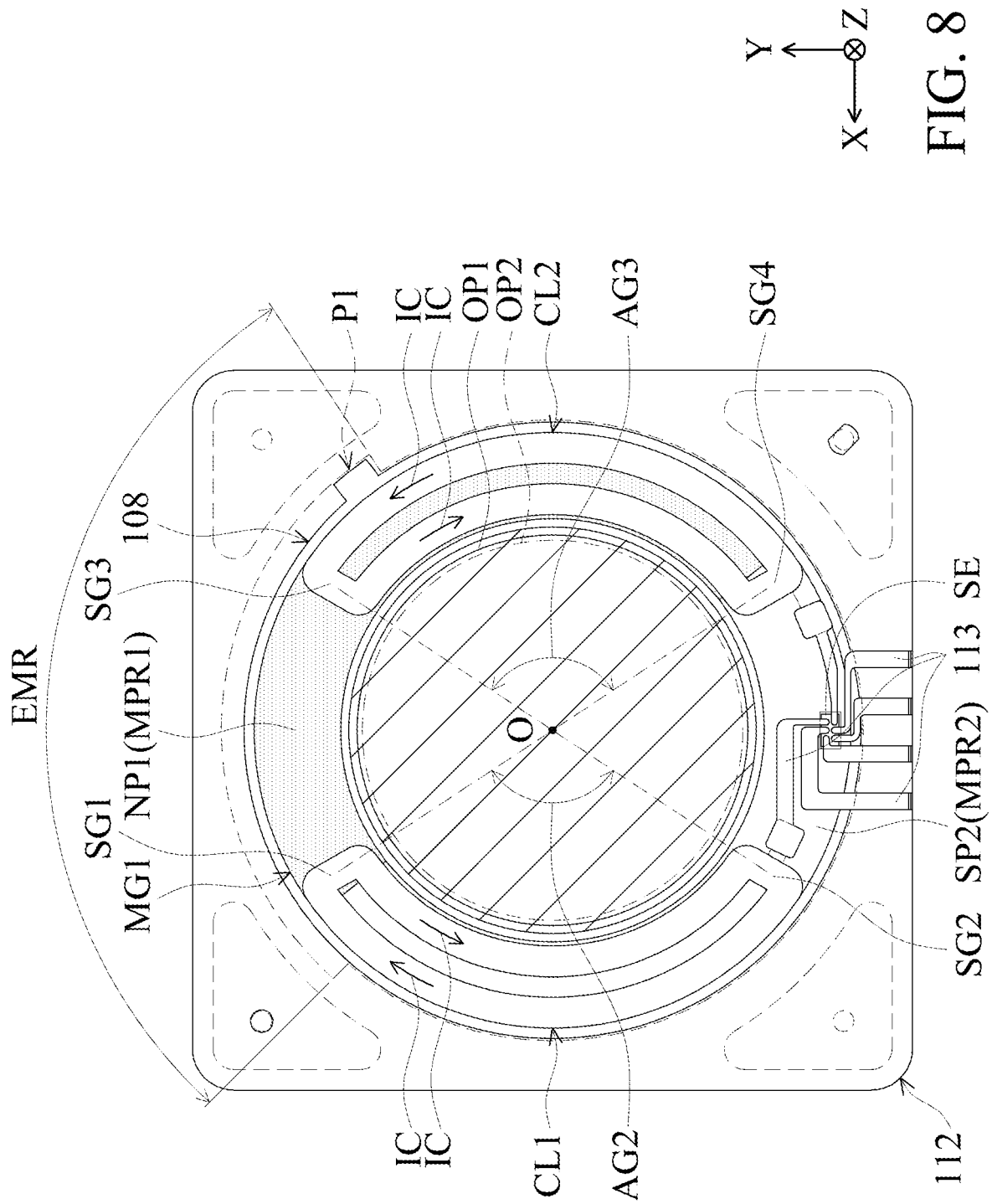
FIG. 8 is a bottom view of the movable part 108 at the first position according to an embodiment of the present disclosure.

When viewed along the optical axis O, the maximum size of the first opening OP1 is different from the maximum size of the second opening OP2. For example, when viewed along the optical axis O, the maximum size of the first opening OP1 is greater than the maximum size of the second opening OP2 (FIG. 8).

In this embodiment, the driving assembly DA is configured to drive the movable part 108 to rotate around a rotating axis RX to adjust the polarity (phase) of the light beam L. The rotating axis RX can be parallel to and/or overlap with the optical axis O.

In this embodiment, the driving assembly DA may include a first coil CL1, a second coil CL2, and a magnetic element MG1. The magnetic element MG1 is fixedly disposed on the bottom of the movable part 108, and when the first coil CL1 and the second coil CL2 are energized, an electromagnetic driving force is generated to drive the movable part 108 to rotate around the rotating axis RX.

Figure 4:
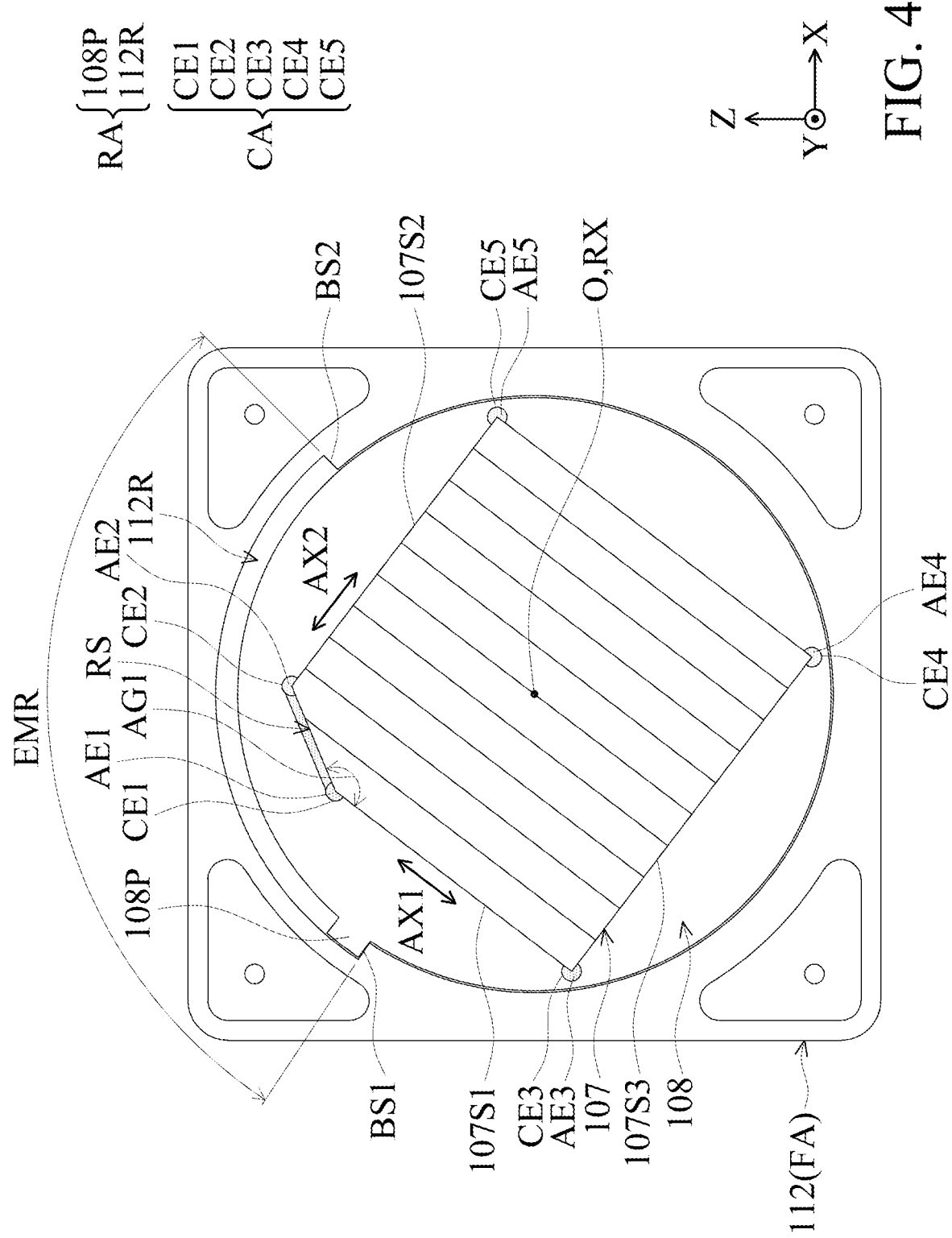
FIG. 4 is a top view of a partial structure of the optical element driving mechanism 100 according to an embodiment of the present disclosure.

Please refer to FIG. 1 to FIG. 4 together. FIG. 4 is a top view of a partial structure of the optical element driving mechanism 100 according to an embodiment of the present disclosure. As shown in FIG. 2, the movable part 108 has a receiving structure 108R configured to receive the optical element 107. Furthermore, as shown in FIG. 4, the movable part 108 further includes a connecting assembly CA configured to position the optical element 107, and the optical element 107 has an identification structure RS corresponding to the connecting assembly CA.

When viewed along the optical axis O, the optical element 107 may have a polygonal structure. When viewed along the optical axis O, the optical element 107 may include a first side 107S1 and a second side 107S2. The first side 107S1 is parallel to a first axis AX1, and the second side 107S2 is parallel to a second axis AX2. The first axis AX1 is perpendicular to the second axis AX2.

When viewed along the optical axis O, the identification structure RS has a recessed structure, and the identification structure RS is located between the first side 107S1 and the second side 107S2. When viewed along the optical axis O, the identification structure RS has a hypotenuse, which is not parallel to the first side 107S1 and the second side 107S2.

When viewed along the optical axis O, the included angle between the hypotenuse and the first side 107S1 is different from the included angle between the hypotenuse and the second side 107S2. For example, when viewed along the optical axis O, an included angle AG1 between the hypotenuse and the first side 107S1 is between 140 degrees and 175 degrees.

In this embodiment, the connecting assembly CA may include a first connecting element CE1, a second connecting element CE2, a third connecting element CE3, a fourth connecting element CE4, and a fifth connecting element CE5. The first connecting element CE1 corresponds to the optical element 107, the second connecting element CE2 corresponds to the optical element 107, and the third connecting element CE3 corresponds to the optical element 107. Each of the first connecting element CE1 to the fifth connecting element CE5 has a recessed structure.

When viewed along the optical axis O, the optical element 107 further includes a third side 107S3, which is parallel to the second axis AX2. The first connecting element CE1 is disposed between the first side 107S1 and the hypotenuse, the second connecting element CE2 is disposed between the second side 107S2 and the hypotenuse, and the third connecting element CE3 is disposed between the first side 107S1 and the third side 107S3.

When viewed along the optical axis O, the first connecting element CE1 is located between the second connecting element CE2 and the third connecting element CE3. When viewed along the optical axis O, the shortest distance between the first connecting element CE1 and the second connecting element CE2 is different from the shortest distance between the first connecting element CE1 and the third connecting element CE3.

Furthermore, the optical element driving mechanism 100 may further include a first adhesive element AE1, a second adhesive element AE2, and a third adhesive element AE3. The optical element 107 is fixedly connected to the movable part 108 by the first adhesive element AE1, the optical element 107 is fixedly connected to the movable part 108 by the second adhesive element AE2, and the optical element 107 is fixedly connected to the movable part 108 by the third adhesive element AE3.

For example, the first adhesive element AE1 is disposed in the first connecting element CE1. The first adhesive element AE1 is in direct contact with the first side 107S1, and the first adhesive element AE1 is in direct contact with the hypotenuse.

The second adhesive element AE2 is disposed in the second connecting element CE2. The second adhesive element AE2 is in direct contact with the second side 107S2, and the second adhesive element AE2 is in direct contact with the hypotenuse.

The third adhesive element AE3 is disposed in the third connecting element CE3, the third adhesive element AE3 is in direct contact with the third side 107S3, and the third adhesive element AE3 is in direct contact with the first side 107S1.

It is worth noting that a gap is formed between the first adhesive element AE1 and the third adhesive element AE3, and the first adhesive element AE1 and the third adhesive element AE3 are not in contact with each other. The first adhesive element AE1 and the second adhesive element AE2 are integrally formed. That is, the first adhesive element AE1 is in contact with the second adhesive element AE2.

Similarly, the optical element driving mechanism 100 may further include a fourth adhesive element AE4 and a fifth adhesive element AE5, which are respectively disposed in the fourth connecting element CE4 and the fifth connecting element CE5. Based on the above-mentioned first adhesive element AE1 to fifth adhesive element AE5, the optical element 107 can be firmly disposed on the movable part 108.

Figure 5:
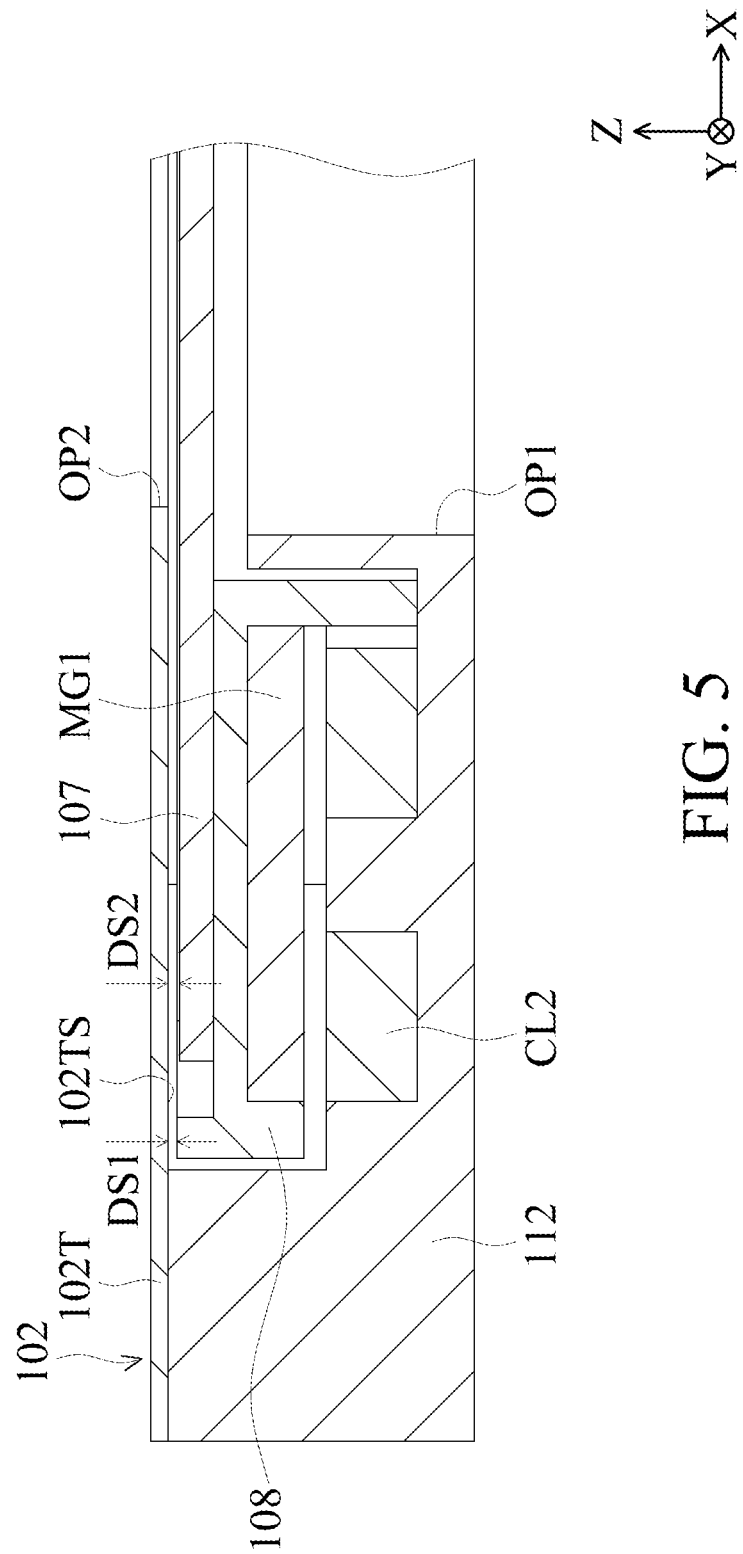
FIG. 5 is an enlarged view of FIG. 3 according to an embodiment of the present disclosure.

Please refer to FIG. 5, which is an enlarged view of FIG. 3 according to an embodiment of the present disclosure. As shown in FIG. 5, the top wall 102T has a top wall surface 102TS facing the movable part 108. The top wall surface 102TS faces the optical element 107. It is worth noting that the shortest distance DS1 between the movable part 108 and the top wall surface 102TS is less than the shortest distance DS2 between the optical element 107 and the top wall surface 102TS, so that the problem of the optical element 107 being damaged by impact can be avoided.

Please go back to FIG. 4. In this embodiment, the optical element driving mechanism 100 further includes a restricting assembly RA configured to restrict the movable part 108 to rotate within an extreme motion range EMR relative to the base 112 of the fixed assembly FA. For example, the extreme motion range EMR is greater than 90 degrees, but it is not limited to this.

The restricting assembly RA includes a protruding portion 108P and a recessed portion 112R. The protruding portion 108P and the movable part 108 are integrally formed in one piece, and the recessed portion 112R is formed on the base 112 corresponding to the protruding portion 108P. The recessed portion 112R has a first blocking surface BS1 and a second blocking surface BS2.

As shown in FIG. 4, when the movable part 108 is located in a first extreme position (the leftmost position) relative to the fixed assembly FA, the protruding portion 108P is in direct contact with the first blocking surface BS1. In addition, when the movable part 108 is rotated to the rightmost position, the movable part 108 is located in a second extreme position relative to the fixed assembly FA, and at this time, the protruding portion 108P is in direct contact with the second blocking surface BS2.

The included angle formed by the first blocking surface BS1 and the second blocking surface BS2 is not 90 degrees. For example, the included angle formed by the first blocking surface BS1 and the second blocking surface BS2 is greater than 90 degrees.

Figure 6:
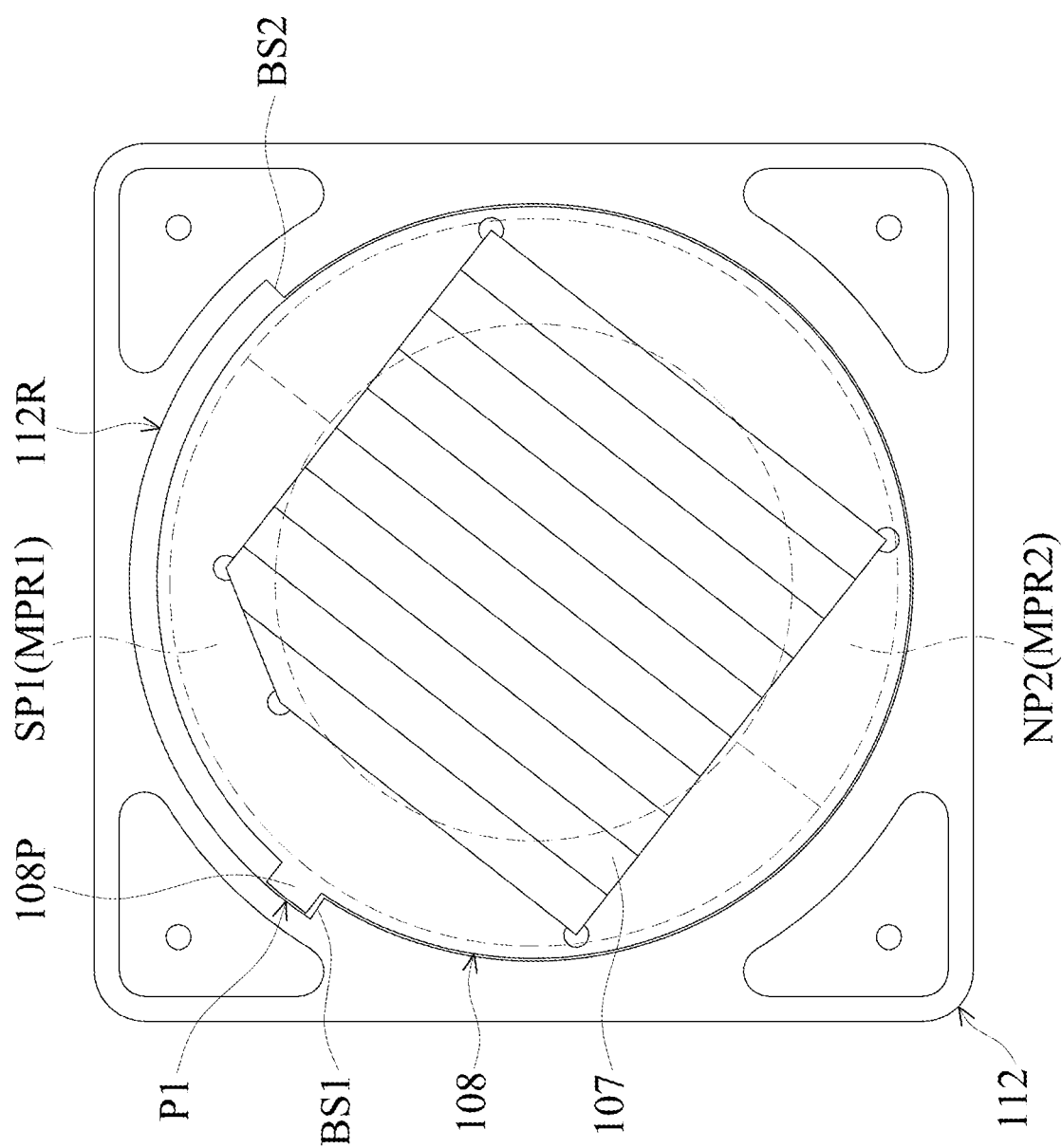
FIG. 6 is a top view of the movable part 108 at a first position P1 according to an embodiment of the present disclosure.
Figure 7:
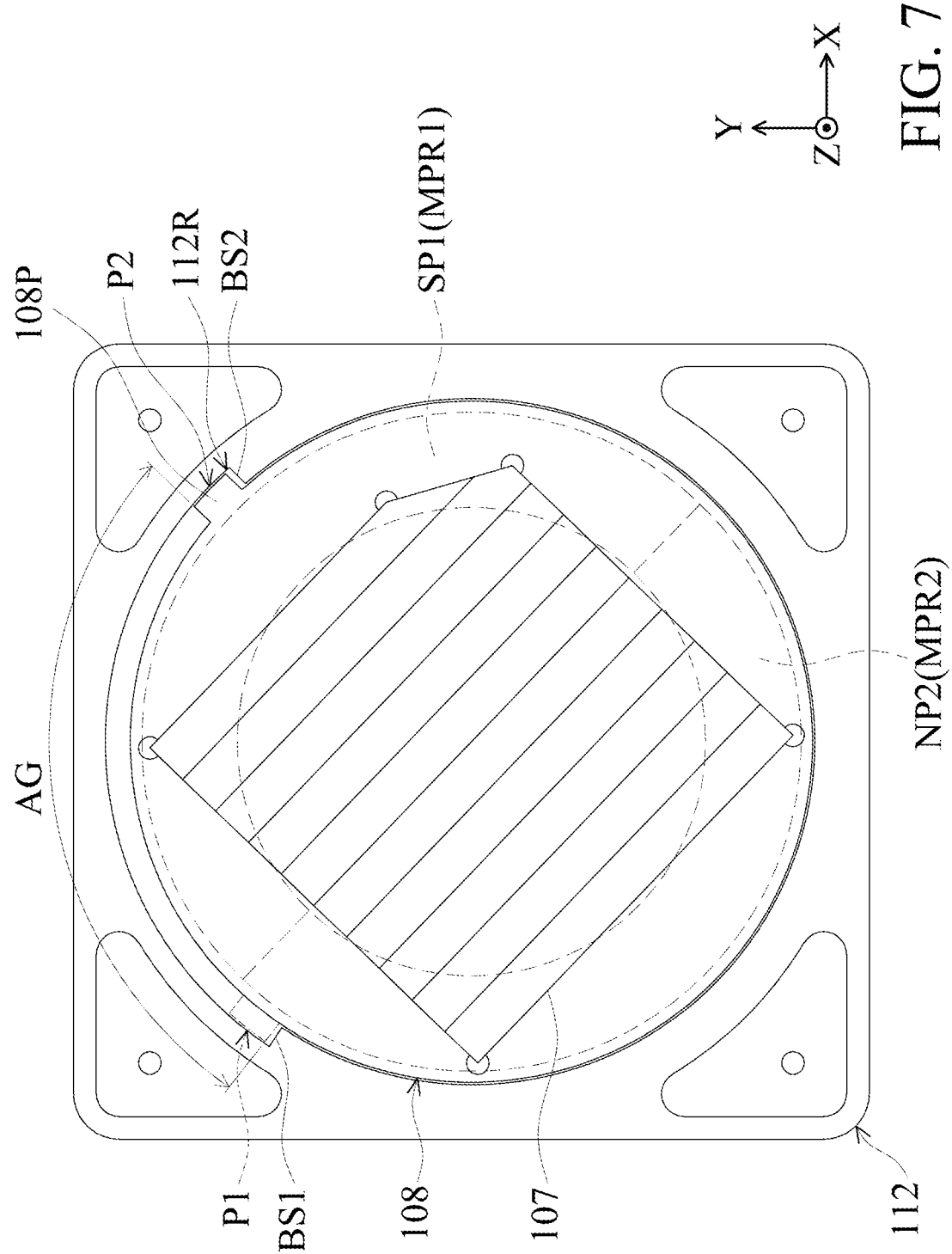
FIG. 7 is a top view of the movable part 108 at a second position P2 according to an embodiment of the present disclosure.

Please refer to FIG. 2, FIG. 4, FIG. 6, and FIG. 7. FIG. 6 is a top view of the movable part 108 at a first position P1 according to an embodiment of the present disclosure, and FIG. 7 is a top view of the movable part 108 at a second position P2 according to an embodiment of the present disclosure. In this embodiment, the optical element driving mechanism 100 may further include a control assembly 130 configured to control the driving assembly DA to drive the movable part 108 to be in the first position P1 or the second position P2 relative to the fixed assembly FA. The control assembly 130 may be, for example, a control chip.

The optical element driving mechanism 100 further includes a sensing element SE, which is disposed on the base 112 and configured to sense the position of the movable part 108 relative to the base 112. Specifically, the sensing element SE is configured to sense changes in the magnetic field of the magnetic element MG1 and output a sensing signal to the control assembly 130.

The sensing element SE may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

The control assembly 130 stores a look-up table, which is composed of the position of the movable part 108 and the magnetic field code (corresponding to the sensing signal). The control assembly 130 can obtain the position of the movable part 108 relative to the base 112 according to the look-up table and the sensing signal, thereby performing closed-loop control.

In this embodiment, as shown in FIG. 7, an angle AG between the first position P1 and the second position P2 is 90 degrees. It should be noted that the first position P1 in FIG. 6 is different from the first extreme position and the second extreme position in FIG. 4. Similarly, the second position P2 is different from the first extreme position and the second extreme position.

When the movable part 108 is located in the first position P1, the protruding portion 108P does not contact the recessed portion 112R. That is, the protruding portion 108P is not in direct contact with the first blocking surface BS1. Similarly, when the movable part 108 is located in the second position P1, the protruding portion 108P does not contact the recessed portion 112R. That is, the protruding portion 108P is not in direct contact with the second blocking surface BS2.

Figure 9:
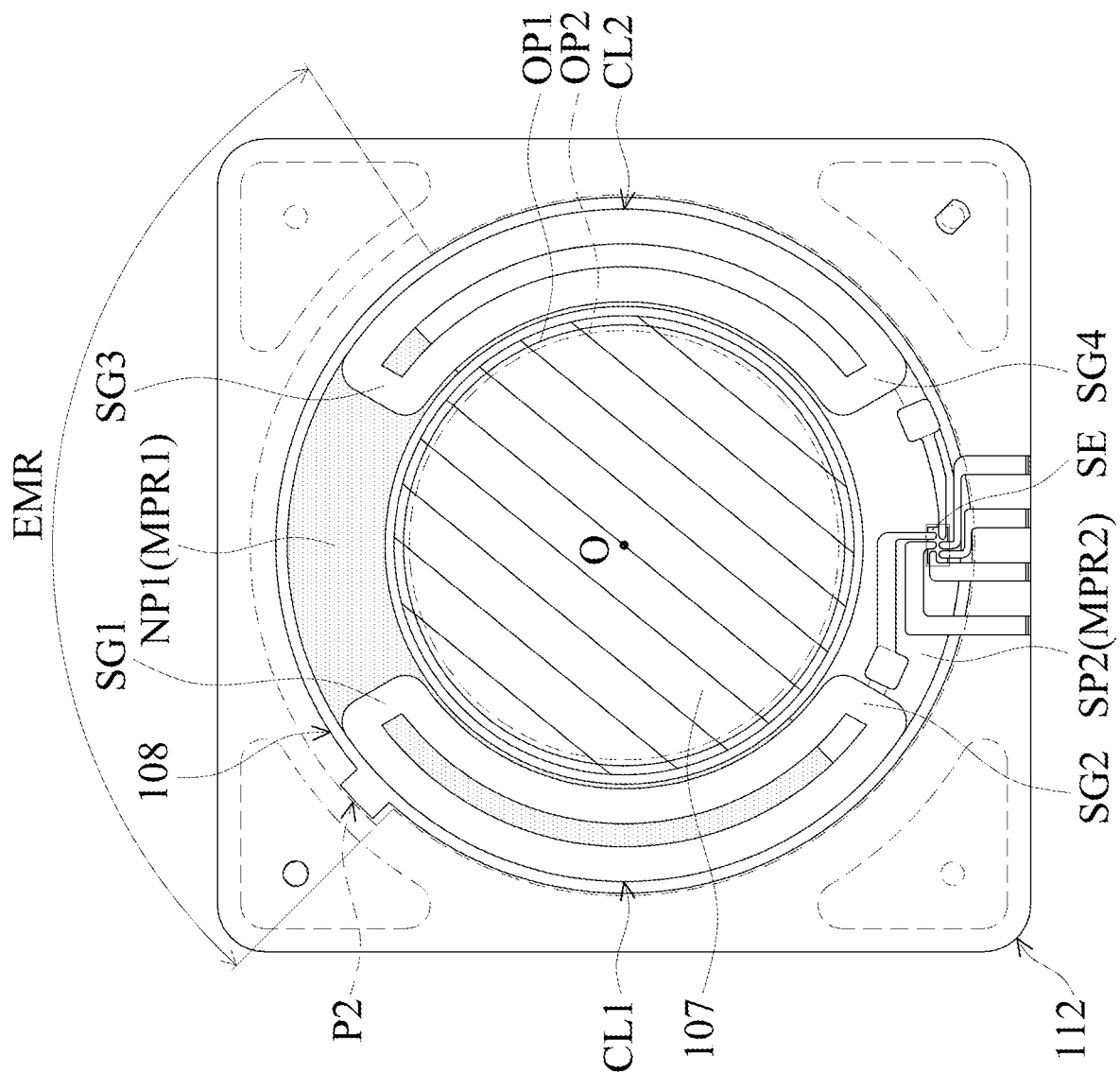
FIG. 9 is a bottom view of the movable part 108 at the second position according to an embodiment of the present disclosure.

Please refer to FIG. 8 to FIG. 9. FIG. 8 is a bottom view of the movable part 108 at the first position according to an embodiment of the present disclosure, and FIG. 9 is a bottom view of the movable part 108 at the second position according to an embodiment of the present disclosure. As shown in FIG. 8, the first coil CL1 may include a first section SG1 and a second section SG2. The first section SG1 has a linear structure, and the second section SG2 has a linear structure. When viewed along the optical axis O, an included angle AG2 between the first section SG1 and the second section SG2 is greater than 90 degrees.

Similarly, the second coil CL2 includes a third section SG3 and a fourth section SG4. The third section SG3 has a linear structure, and the fourth section SG4 has a linear structure. When viewed along the optical axis O, an included angle AG3 between the third section SG3 and the fourth section SG4 is greater than 90 degrees.

In this embodiment, the first coil CL1 is electrically connected to the second coil CL2. When a current IC enters the driving assembly DA and when viewed along the optical axis O, the current direction of the first coil CL1 is opposite to the current direction of the second coil CL2. For example, the direction of the current IC in the first coil CL1 is clockwise, and the direction of the current IC in the second coil CL2 is counterclockwise.

Please continue to refer to FIG. 6 to FIG. 9. In this embodiment, the magnetic element MG1 includes a first magnetic pole pair MPR1 and a second magnetic pole pair MPR2. The first magnetic pole pair MPR1 includes a first north pole NP1 and a first south pole SP1, and the arrangement direction of the first north pole NP1 and the first south pole SP1 is parallel to the optical axis O (the Z-axis). The first north pole NP1 faces the first section SG1, and the first north pole NP1 faces the third section SG3.

The second magnetic pole pair MPR2 includes a second north pole NP2 and a second south pole SP2. The arrangement direction of the second north pole NP2 and the second south pole SP2 is parallel to the optical axis O. The second south pole SP2 faces the second section SG2, and the second south pole SP2 faces the fourth section SG4. It should be noted that the arrangement direction of the first north pole NP1 and the first south pole SP1 is opposite to the arrangement direction of the second north pole NP2 and the second south pole SP2.

As shown in FIG. 8 and FIG. 9, when the movable part 108 is located in any position within the extreme motion range EMR and when viewed along the optical axis O, the first section SG1 remains partially overlapping the first north pole NP1 of the first magnetic pole pair MPR1.

When the movable part 108 is located in any position within the extreme motion range EMR and when viewed along the optical axis O, the third section SG3 remains partially overlapping the first north pole NP1 of the first magnetic pole pair MPR1.

When the movable part 108 is located in any position within the extreme motion range EMR and when viewed along the optical axis O, the first section SG1 and the second magnetic pole pair MPR2 remain non-overlapping (that is, the first section SG1 and the second magnetic pole pair MPR2 do not overlap). When the movable part 108 is located in any position within the extreme motion range EMR and when viewed along the optical axis O, the third section SG3 and the second magnetic pole pair MPR2 remain non-overlapping.

When the movable part 108 is located in any position within the extreme motion range EMR and when viewed along the optical axis O, the second section SG2 remains partially overlapping the second magnetic pole pair MPR2. When the movable part 108 is located in any position within the extreme motion range EMR and when viewed along the optical axis O, the fourth section SG4 remains partially overlapping the second magnetic pole pair MPR2.

When the movable part 108 is located in any position within the extreme motion range EMR and when viewed along the optical axis O, the second section SG2 and the first magnetic pole pair MPR1 remain non-overlapping. When the movable part 108 is located in any position within the extreme motion range EMR and when viewed along the optical axis O, the fourth section SG4 and the first magnetic pole pair MPR1 remain non-overlapping.

It should be noted that the first magnetic pole pair MPR1 and the second magnetic pole pair MPR2 are integrally formed in one piece. That is, the first magnetic pole pair MPR1 and the second magnetic pole pair MPR2 do not need to use glue to adhere to each other.

In addition, it should be noted that, as shown in FIG. 8, the optical element driving mechanism 100 may include a plurality of circuit members 113, which are disposed in the base 112 by insert molding technology. For example, the base 112 may be made of a non-metal material, such as a plastic material, and the circuit member 113 may be made of a metal material. The circuit members 113 are configured to be electrically connected to the sensing element SE and the driving assembly DA.

Figure 10:
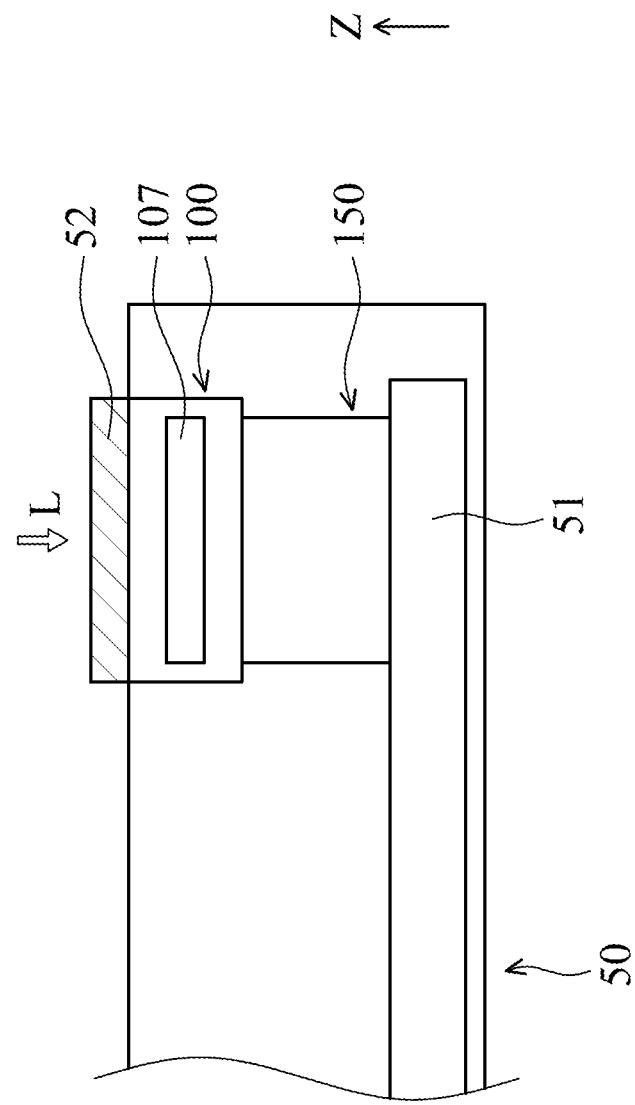
FIG. 10 is a schematic cross-sectional view of the optical element driving mechanism 100 installed in an electronic apparatus 50 according to an embodiment of the present disclosure.

Please refer to FIG. 10, which is a schematic cross-sectional view of the optical element driving mechanism 100 installed in an electronic apparatus 50 according to an embodiment of the present disclosure. The electronic apparatus 50 is, for example, a smartphone, but it is not limited thereto. The electronic apparatus 50 has a main circuit board 51, and the optical element driving mechanism 100 is configured to be installed on the optical module 150 and the main circuit board 51 of the electronic apparatus 50.

The light beam L is incident on the optical module 150 after passing through the optical element driving mechanism 100. Furthermore, the electronic apparatus 50 may further include a protection element 52 configured to protect the optical element driving mechanism 100. The light beam L can be incident on the optical element 107 after passing through the protection element 52. For example, the protection element 52 is made of a light-transmissible material, such as glass or transparent plastic.

In summary, the present disclosure provides an optical element driving mechanism, including a movable part, a fixed assembly, and a driving assembly. The movable part is movable relative to fixed assembly. The driving assembly is configured to drive the movable part to move relative to the fixed assembly. A receiving structure is formed on the movable part, which is configured to receive the optical element, and the optical element has an identification structure, so that the optical element can be quickly positioned on the movable part.

The movable part also includes a connecting assembly configured to position the optical element. The connecting assembly includes multiple connecting elements, which are communicated with the receiving structure. For example, each of the connecting elements has an arc-shaped groove, and multiple adhesive elements can be respectively disposed in the connecting elements and configured to fix the optical element on the movable part. Based on the design of this disclosure, it can be ensured that when the optical element driving mechanism is impacted, the optical element can be stably fixed on the movable part.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a movable part, configured to be connected to an optical element;
a fixed assembly, wherein the movable part is movable relative to the fixed assembly;
a driving assembly, configured to drive the movable part to move relative to the fixed assembly;
wherein the movable part includes a connecting assembly configured to position the optical element;
wherein the optical element has a plate-shaped structure;
the optical element has a light-transmissible material;
the optical element includes a polarizer;
the optical element has an identification structure corresponding to the connecting assembly;
when viewed along the optical axis, the optical element includes:
a first side, parallel to a first axis; and
a second side, parallel to a second axis;
the first axis is not parallel to the second axis;
when viewed along the optical axis, the identification structure has a recessed structure;
wherein the identification structure is located between the first side and the second side;
when viewed along the optical axis, the identification structure has a hypotenuse, which is not parallel to the first side and the second side.

2. The optical element driving mechanism as claimed in claim 1, wherein
a light beam travels along an optical axis to pass through the optical element and a first opening of the fixed assembly;
the driving assembly is configured to drive the movable part to rotate around a rotating axis;
the rotating axis is parallel to the optical axis.

3. The optical element driving mechanism as claimed in claim 2, wherein when viewed along the optical axis, an included angle between the hypotenuse and the first side is different from an included angle between the hypotenuse and the second side;

when viewed along the optical axis, the included angle between the hypotenuse and the first side is between 140 degrees and 175 degrees.

4. The optical element driving mechanism as claimed in claim 3, wherein the connecting assembly includes:
a first connecting element, corresponding to the optical element;
a second connecting element, corresponding to the optical element; and
a third connecting element, corresponding to the optical element;
the first connecting element has a recessed structure;
the second connecting element has a recessed structure;
the third connecting element has a recessed structure.

5. The optical element driving mechanism as claimed in claim 4, wherein
when viewed along the optical axis, the optical element further includes a third side, which is parallel to the second axis;
the first connecting element is disposed between the first side and the hypotenuse;
the second connecting element is disposed between the second side and the hypotenuse;
the third connecting element is disposed between the first side and the third side;
when viewed along the optical axis, the optical element has a polygonal structure.

6. The optical element driving mechanism as claimed in claim 5, wherein
when viewed along the optical axis, the first connecting element is located between the second connecting element and the third connecting element;
when viewed along the optical axis, a shortest distance between the first connecting element and the second connecting element is different from a shortest distance between the first connecting element and the third connecting element.

7. The optical element driving mechanism as claimed in claim 6, wherein the optical element driving mechanism further includes:
a first adhesive element, wherein the optical element is fixedly connected to the movable part by the first adhesive element;
a second adhesive element, wherein the optical element is fixedly connected to the movable part by the second adhesive element; and
a third adhesive element, wherein the optical element is fixedly connected to the movable part by the third adhesive element;
the first adhesive element is disposed in the first connecting element;
the first adhesive element is in direct contact with the first side;
the first adhesive element is in direct contact with the hypotenuse;
the second adhesive element is disposed in the second connecting element;
the second adhesive element is in direct contact with the second side;
the second adhesive element is in direct contact with the hypotenuse.

8. The optical element driving mechanism as claimed in claim 7, wherein the third adhesive element is disposed in the third connecting element;
the third adhesive element is in direct contact with the third side;
the third adhesive element is in direct contact with the first side;
there is a gap between the first adhesive element and the third adhesive element;
the first adhesive element and the second adhesive element are integrally formed.

9. The optical element driving mechanism as claimed in claim 8, wherein the fixed assembly includes:
an outer frame, having a top wall with a plate-shaped structure; and
a base, forming an accommodating space with the outer frame to accommodate the movable part;
the first opening is formed on the base;
the fixed assembly further includes a second opening formed on the top wall;
the light beam enters the optical element driving mechanism and is configured to sequentially pass through the second opening, the optical element, and the first opening.

10. The optical element driving mechanism as claimed in claim 9, wherein
when viewed along the optical axis, a maximum size of the first opening is different from a maximum size of the second opening;
when viewed along the optical axis, the maximum size of the first opening is greater than the maximum size of the second opening;
the movable part has a receiving structure configured to receive the optical element;
the top wall has a top wall surface facing the movable part;
the top wall surface faces the optical element;
a shortest distance between the movable part and the top wall surface is less than a shortest distance between the optical element and the top wall surface.

11. The optical element driving mechanism as claimed in claim 10, wherein
the optical element driving mechanism further includes a restricting assembly configured to restrict the movable part to rotate within an extreme motion range relative to the fixed assembly;
the extreme motion range is greater than 90 degrees;
the restricting assembly includes:
a protruding portion, wherein the protruding portion and the movable part are integrally formed in one piece; and
a recessed portion, corresponding to the protruding portion and having a first blocking surface and a second blocking surface;
when the movable part is located in a first extreme position relative to the fixed assembly, the protruding portion is in direct contact with the first blocking surface;
when the movable part is located in a second extreme position relative to the fixed assembly, the protruding portion is in direct contact with the second blocking surface;
an included angle formed by the first blocking surface and the second blocking surface is not 90 degrees.

12. The optical element driving mechanism as claimed in claim 11, wherein the light beam is incident on an optical module after passing through the optical element driving mechanism;

the optical element driving mechanism is configured to be installed in an electronic apparatus;

the electronic apparatus includes a protection element, and the light beam is incident on the optical element after passing through the protection element;

the protection element has a light-transmissible material.

13. The optical element driving mechanism as claimed in claim 12, wherein the optical element driving mechanism further includes a control assembly configured to control the driving assembly to drive the movable part to be in a first position or a second position relative to the fixed assembly;

an angle between the first position and the second position is 90 degrees.

14. The optical element driving mechanism as claimed in claim 13, wherein the first position is different from the first extreme position and the second extreme position;

the second position is different from the first extreme position and the second extreme position;

when the movable part is located in the first position, the protruding portion does not contact the recessed portion;

when the movable part is located in the second position, the protruding portion does not contact the recessed portion.

15. The optical element driving mechanism as claimed in claim 14, wherein the driving assembly includes:

a first coil;

a second coil; and a magnetic element;

the first coil includes:

a first section, having a linear structure; and a second section, having a linear structure;

when viewed along the optical axis, an included angle between the first section and the second section is greater than 90 degrees;

the second coil includes:

a third section, having a linear structure; and a fourth section, having a linear structure;

when viewed along the optical axis, an included angle between the third section and the fourth section is greater than 90 degrees.

16. The optical element driving mechanism as claimed in claim 15, wherein the first coil is electrically connected to the second coil;

when a current enters the driving assembly and when viewed along the optical axis, a current direction of the first coil is opposite to a current direction of the second coil;

the magnetic element includes:

a first magnetic pole pair, including a first north pole and a first south pole; and a second magnetic pole pair, including a second north pole and a second south pole;

an arrangement direction of the first north pole and the first south pole is parallel to the optical axis;

the first north pole faces the first section;

the first north pole faces the third section.

17. The optical element driving mechanism as claimed in claim 16, wherein an arrangement direction of the second north pole and the second south pole is parallel to the optical axis;

the second south pole faces the second section;

the second south pole faces the fourth section;

the arrangement direction of the first north pole and the first south pole is opposite to the arrangement direction of the second north pole and the second south pole.

18. The optical element driving mechanism as claimed in claim 17, wherein when the movable part is located in any position within the extreme motion range and when viewed along the optical axis, the first section remains partially overlapping the first magnetic pole pair;

when the movable part is located in any position within the extreme motion range and when viewed along the optical axis, the third section remains partially overlapping the first magnetic pole pair;

when the movable part is located in any position within the extreme motion range and when viewed along the optical axis, the first section and the second magnetic pole pair remain non-overlapping;

when the movable part is located in any position within the extreme motion range and when viewed along the optical axis, the third section and the second magnetic pole pair remain non-overlapping.

19. The optical element driving mechanism as claimed in claim 18, wherein when the movable part is located in any position within the extreme motion range and when viewed along the optical axis, the second section remains partially overlapping the second magnetic pole pair;

when the movable part is located in any position within the extreme motion range and when viewed along the optical axis, the fourth section remains partially overlapping the second magnetic pole pair;

when the movable part is located in any position within the extreme motion range and when viewed along the optical axis, the second section and the first magnetic pole pair remain non-overlapping;

when the movable part is located in any position within the extreme motion range and when viewed along the optical axis, the fourth section and the first magnetic pole pair remain non-overlapping;

the first magnetic pole pair and the second magnetic pole pair are integrally formed in one piece.

* * * * *